(12) United States Patent
Yang et al.

(10) Patent No.: US 7,823,647 B2
(45) Date of Patent: Nov. 2, 2010

(54) PROCESS FOR FOAMING A WET HYDROCARBON COMPOSITION

(75) Inventors: Jiang Yang, Missouri City, TX (US); Vladimir Jovancicevic, Richmond, TX (US); Mark Caskie, Aberdeen (GB)

(73) Assignee: Baker Hughes Incorporated, Houston, TX (US)

( * ) Notice: Subject to any disclaimer, the term of this patent is extended or adjusted under 35 U.S.C. 154(b) by 475 days.

(21) Appl. No.: 11/518,017

(22) Filed: Sep. 8, 2006

(65) Prior Publication Data

US 2007/0079963 A1    Apr. 12, 2007

Related U.S. Application Data

(60) Provisional application No. 60/724,177, filed on Oct. 6, 2005.

(51) Int. Cl.
*E21B 43/00* (2006.01)

(52) U.S. Cl. ..................... 166/372; 166/309

(58) Field of Classification Search ............ None
See application file for complete search history.

(56) References Cited

U.S. PATENT DOCUMENTS

| | | | | |
|---|---|---|---|---|
| 2,970,150 A * | 1/1961 | Bailey | | 549/215 |
| 3,330,346 A * | 7/1967 | Jacobs et al. | | 166/401 |
| 3,669,189 A | 6/1972 | Fischer | | 166/279 |
| 3,963,377 A | 6/1976 | Elliott et al. | | 417/90 |
| 3,997,580 A | 12/1976 | Morehouse | | 260/448.2 N |
| 4,164,574 A | 8/1979 | Quinlan | | 424/199 |
| 4,301,868 A * | 11/1981 | Scherubel et al. | | 166/308.6 |
| 4,380,451 A | 4/1983 | Steinberger et al. | | 8/477 |
| 4,607,700 A | 8/1986 | Duerksen et al. | | 166/303 |
| 4,828,029 A * | 5/1989 | Irani | | 166/268 |
| 4,903,771 A | 2/1990 | Hanssen et al. | | 166/292 |
| 5,089,619 A | 2/1992 | Thompson et al. | | 544/357 |
| 5,211,242 A | 5/1993 | Coleman et al. | | 166/372 |
| 5,325,920 A * | 7/1994 | Djabbarah | | 166/402 |
| 5,389,706 A | 2/1995 | Heathman et al. | | 524/5 |
| 5,474,709 A | 12/1995 | Herzig et al. | | 252/231 |
| 5,499,908 A | 3/1996 | Schmitz, III | | 417/368 |
| 5,547,022 A * | 8/1996 | Juprasert et al. | | 166/263 |
| 5,753,596 A | 5/1998 | Martin et al. | | 507/237 |
| 5,871,048 A | 2/1999 | Tokar et al. | | 166/263 |
| 6,165,945 A | 12/2000 | Halliday et al. | | 507/139 |
| 6,221,815 B1 * | 4/2001 | Grabowski et al. | | 508/208 |
| 6,270,653 B1 | 8/2001 | Gochin et al. | | 208/44 |
| 6,508,304 B2 | 1/2003 | Gagliardi | | 166/105 |
| 6,632,778 B1 * | 10/2003 | Ayoub et al. | | 507/202 |
| 6,936,099 B2 | 8/2005 | Ayambem | | 106/817 |
| 7,565,933 B2 * | 7/2009 | Kippie et al. | | 166/372 |
| 2002/0129542 A1 * | 9/2002 | Grabowski et al. | | 44/320 |
| 2003/0008779 A1 * | 1/2003 | Chen et al. | | 507/200 |
| 2004/0177968 A1 * | 9/2004 | Ramachandran | | 166/372 |
| 2005/0003969 A1 * | 1/2005 | DiLullo et al. | | 507/211 |
| 2005/0113272 A1 * | 5/2005 | Yeung et al. | | 510/235 |

FOREIGN PATENT DOCUMENTS

| | | | |
|---|---|---|---|
| WO | WO02/092693 A1 | 11/2002 | |
| WO | WO2006/094387 | * | 9/2006 |

OTHER PUBLICATIONS

S. Ramachandran et al.; "Surfactant Dewatering of Production and Gas Storage Wells," SPE 84823, SPE Eastern Regional/AAPG Eastern Section Joint Meeting, Pittsburgh, Pennsylvania, Sep. 6-10, 2003, pp. 1-5.

S. Campbell et al.; "Corrosion Inhibition/Foamer Combination Treatment to Enhance Gas Production," SPE 67325, SPE Production and Operations Symposium, Oklahoma City, Oklahoma, Mar. 24-27, 2001, pp. 1-9.

* cited by examiner

*Primary Examiner*—Zakiya W Bates
*Assistant Examiner*—Angela M DiTrani
(74) *Attorney, Agent, or Firm*—Mossman, Kumar & Tyler, PC

(57) ABSTRACT

A composition of a wet hydrocarbon foaming agent including a siloxane can foam wet hydrocarbons. The siloxane wet hydrocarbon foaming agent advantageously foams hydrocarbons that have as little as 5 percent water present and those hydrocarbons having as much as 90 percent water present. The wet hydrocarbon foaming agent can be used in oil and gas production for gas lift and foam blocking applications. The foaming agent can also be used for clearing hydrocarbons from pipelines and other vessels used for transporting oil and gas.

5 Claims, No Drawings

PROCESS FOR FOAMING A WET HYDROCARBON COMPOSITION

CROSS REFERENCE TO RELATED APPLICATION

This application claims priority from the U.S. Provisional Patent Application having the Ser. No. 60/724,177 filed Oct. 6, 2005.

BACKGROUND OF THE INVENTION

1. Field of the Invention

The present invention relates to a process for foaming wet hydrocarbons. The present invention particularly relates to a process for foaming wet hydrocarbons in conjunction with oil and gas production and transport.

2. Background of the Art

Oil from oil bearing earth formations is usually first produced by the inherent formation pressure of the oil bearing earth formations. In some cases, however, the oil bearing formation lacks sufficient inherent pressure to force the oil from the formation upward to the surface. In other cases, the inherent pressure of an oil-bearing formation can be expended prior to the recovery of all of the recoverable oil so that when the pressure of the production zone has been reduced by continued withdrawal, the well will stop flowing. When this occurs, artificial methods of lifting the oil from the formation to the surface are usually employed.

One method of continuing production is to provide mechanical pumping operations wherein the pump is located at the surface. In U.S. Pat. No. 3,963,377 to Elliott, et al., a pneumatically powered submerged pump for lifting high viscosity oil from an oil well is disclosed. Another popular method for achieving production from wells that no longer are capable of natural flow is by the gas lift method.

Gas injection into an oil well is a well-known artificial lift method for facilitating oil recovery from the oil well. This method is commonly referred to as gas lift recovery or, most often, simply as a gas lift. A typical gas lift method provides a lift gas at the surface that is conveyed to a surface wellhead connection where the lift gas is injected into the casing-tubing annulus of the well. Upon injection, the lift gas travels down the casing-tubing annulus to a plurality of specially designed subsurface gas injection valves that enable the lift gas to enter the tubing string. The lift gas commingles with the formation fluids in the tubing string, lifting the formation fluids up the tubing string to the surface.

As is taught in U.S. Pat. No. 5,871,048 to Tokar, et al., there are significant operational costs associated with gas injection. In Tokar, a method for automatically determining an optimum gas rate is disclosed. While determining the optimum gas flow is an important element in gas lift methods, it is by no means the only factor that should be considered when optimizing a gas lift method for recovering oil from an oil well.

Patent Publication No. WO 02/092963 to Ramachandran discloses a method for recovering oil from a gas-lifted oil well penetrating a subterranean oil-bearing formation using a lift gas and a surfactant wherein the surfactant functions to form a foam. The surfactants disclosed are the group consisting of ethoxylated alcohols and all salts thereof, ethoxylated alkyl phenols and all salts thereof, ethoxylated amines and all salts thereof, alkyl ether sulfates and all salts thereof, all betaines and all salts thereof, all sultaines and all salts thereof, perfluorinated polyurethanes, and mixtures thereof.

Some subterranean formations produce so much natural gas and so little oil that the natural gas is the more desirable product. In these cases, the small amounts of oil produced by the formation can interfere with natural gas production if the driving forces of the formation are, or become too low to move blocking liquids out of the way as the gas leaves the reservoir. In some instances, the hydrocarbons can pool in the well bore of a gas well reducing gas flow out of the well.

One solution to this problem is disclosed in U.S. Pat. No. 6,508,304 to Gagliardi. This reference discloses a multi-level liquid elevator having a plurality of vertically-stacked stages. Each of the stages is of a length which is compatible with the available pressure in the well. That is, the pressure in the well is sufficient to push liquid at least the length of the stage. This allows the liquid blocking the well and the liquid and gas products available in the well to be raised, stage by stage, to any desired elevation, thereby freeing the well for renewed operation.

Another solution is disclosed in U.S. Pat. No. 5,211,242 to Coleman, et al. Therein, it is disclosed that a chamber in a well is connected to two externally separate tubing strings to unload liquid which is applying backpressure against a formation so that the production of fluid from the formation is obstructed. Volumes of the liquid are intermittently collected in the chamber and lifted out of the well through one of the tubing strings in response to high pressure gas injected solely into the chamber through the other tubing string.

It would be desirable in the art of producing oil from oil wells to economically produce oil using a gas lift method. It would be particularly desirable to reduce the cost of producing crude oil using a gas lift method of recovery. Accordingly, it is desirable to economically optimize the gas injection lift method such that the operational costs for the well are balanced with the oil production revenue from the well. It would also be desirable to use such economic processes with transport of hydrocarbons through pipelines and vessels.

SUMMARY OF THE INVENTION

In one aspect, the present invention is a process for producing a foam from a wet hydrocarbon comprising contacting the wet hydrocarbon with a gas in the presence of foaming agent comprising a siloxane.

In still another aspect, the present invention is a composition useful for generating foam from wet hydrocarbons comprising a wet hydrocarbon foaming agent selected from the group consisting of a polysiloxane, an ethoxylated siloxane, a propoxylated siloxane, an ethoxylated and propoxylated siloxane and combinations thereof.

Another aspect of the present invention is a process for recovering oil from a gas-lifted oil well penetrating a subterranean oil-bearing formation, the method comprising: A) providing a lift gas and a wet hydrocarbon foaming agent at an oil well wherein the oil well penetrates a subterranean oil-bearing formation and has formation fluids in the well bore; B) introducing a lift gas into the oil well; and C) introducing a wet hydrocarbon foaming agent into the oil well, wherein: i) the wet hydrocarbon foaming agent functions to: (a) reduce the surface tension between the formation fluids and the lift gas; (b) create a lift gas-formation fluid foam; or (c) both (a) and (b); ii) the surfactant and lift gas are injected into the oil well at a depth sufficiently deep to lift formation fluids to the surface; and iii) the wet hydrocarbon foaming agent is a composition useful for generating foam from wet hydrocarbons comprising a wet hydrocarbon foaming agent selected from the group consisting of a polysiloxane, an ethoxylated siloxane, a propoxylated siloxane, an ethoxylated and propoxylated siloxane and combinations thereof.

In yet another aspect, the present invention is a process for recovering oil from an oil well penetrating a subterranean oil-bearing zone and having at least one additional porous zone between the oil bearing zone and the exit from the oil well, the method comprising using a composition useful for generating foam from wet hydrocarbons comprising a wet hydrocarbon foaming agent selected from the group consisting of a polysiloxane, an ethoxylated siloxane, a propoxylated siloxane, an ethoxylated and propoxylated siloxane and combinations thereof to form a foam and forcing the foam into the one additional porous zone.

An aspect of the present invention is also a process for removing hydrocarbon fluids from a gas producing formation, a gas well, vessel or pipeline comprising contacting the fluid with a composition useful for generating foam from wet hydrocarbons comprising a wet hydrocarbon foaming agent selected from the group consisting of a polysiloxane, an ethoxylated siloxane, a propoxylated siloxane, an ethoxylated and propoxylated siloxane and combinations thereof to form a foam and forcing the foam into the one additional porous zone and a gas under conditions sufficient to form a foam and then sweeping the foam from the vessel or pipeline.

Another aspect of the present invention is a composition useful as an additive for use in oil and gas production comprising a composition useful for generating foam from wet hydrocarbons comprising a wet hydrocarbon foaming agent selected from the group consisting of a polysiloxane, an ethoxylated siloxane, a propoxylated siloxane, an ethoxylated and propoxylated siloxane and combinations thereof, and a material selected from the group consisting of corrosion inhibitors, hydrate inhibitors, bactericides, wax inhibitors, scale inhibitors, asphaltene inhibitors, microbiocides, and mixtures thereof.

DESCRIPTION OF THE PREFERRED EMBODIMENTS

In one embodiment, the present invention is a process for producing a foam from a wet hydrocarbon comprising contacting a wet hydrocarbon with a gas in the presence of a wet hydrocarbon foaming agent. The wet hydrocarbon foaming agent, in one embodiment, is a siloxane. The siloxane can be one of several types, such as an organic polysiloxane and its ethoxylated or propoxylated analogs. The molecular weight of the wet hydrocarbon foaming agent can be from 1,000 to 100,000, preferably from 6,000 to 60,000 daltons. Examples of such siloxanes include polysiloxane, polydimethy siloxane, polyethers of siloxane and ethylene oxide or propylene oxide and those that contain both ethylene oxide and propylene oxide. Typical commercial siloxane products are made by Dow Corning and GE silicone.

Conventional hydrocarbon surfactants and solvents can also be used with the present invention to further increase the effect and delivery of the products. The conventional hydrocarbon surfactants can be nonionic surfactants including, but not limited to, alkoxylated alcohols or ethers; alkyl ethoxylates; alkylamido ethoxylates;alkylamine ethoxylate, alkyl glucosides; alkoxylated carboxylic acids; sorbitan derivatives where the alkyl chain length varies from 8 to 24, for example, nonylphenol ethoxylate; alkyl ethoxylates; oleyl carboxylic diethylamides; and the like and mixtures thereof. The suitable surfactants and mixtures thereof may also include cationic surfactants such as, but not limited to, monoalkyl quaternary amines, such as cocotrimonium chloride; cetyltrimonium chloride; stearyltrimonium chloride; soyatrimonium chloride; behentrimonium chloride; and the like and mixtures thereof. Other cationic surfactants that are useful may include, but are not necessarily limited to, dialkyl quaternary amines such as dicetyldimethyl ammonium chloride, dicocodimethyl ammonium chloride, distearyldimethyl ammonium chloride, and the like and mixtures thereof. Suitable surfactants and mixtures thereof may also include anionic surfactants such as, but are not necessarily limited to, fatty carboxylates, alkyl sarcosinates, alkyl phosphates, alkyl sulfonate, alkyl sulfates and the like and mixtures thereof. The amphoteric/zwitterionic surfactants include, but are not limited to alkyl betaines, alkylamido propyl betaines, alkylampho acetates, alkylamphopropionates, alkylamidopropyl hydroxysultaines and the like and mixtures thereof. Fatty alcohols and fatty amines with chain length from $C_8$ to $C_{24}$ can be also used as co-surfactants. Solvents can be aliphatic, naphtha, aromatic or its mixture. It can be also alcohol or ether derivative such as methanol, ethanol, isopranol, ethylene glycol, propylene glycol and methyl ether ethylene glycol and the like.

In the practice of the process of the present invention, a wet hydrocarbon is admixed with a wet hydrocarbon foaming agent. In the art of producing oil and gas, hydrocarbons are rarely, if ever, recovered without the inclusion of at least small amounts of water. Very often, the formation fluid produced is, by the time it reaches the surface, a multiphase fluid including solids, both dissolved and suspended, and at least two phases including an organic phase and an inorganic phase. It is for this reason that, for the purposes of the present invention, the term "hydrocarbon" includes an admixture additionally comprising water. For the purposes of the present invention, the term wet hydrocarbon means one having at least 5 weight percent water present in the production fluid. In some embodiments, water will be present at a level of 90 percent. Additionally, water may be present at any level between these two levels and still be a wet hydrocarbon.

In the practice of the present invention, a wet hydrocarbon foaming agent is used. The wet hydrocarbon foaming agent can impart a desirable stability to foams generated therewith. It is preferably present at a level of from about 10 ppm to about 100,000 ppm. For example, in one embodiment of the present invention, the wet hydrocarbon foaming agent is present at a concentration of about 250 ppm. In another embodiment, the wet hydrocarbon foaming agent is present at a concentration of about 1 percent or 10,000 ppm.

In the practice of the method of the present invention, the wet hydrocarbon foaming agent can be desirably used at as low of a concentration as is possible, but with a sufficient amount of the wet hydrocarbon foaming agent present to achieve the desired results with as great of a return on investment as possible. Those of ordinary skill in the art of practicing the various end uses of such agents will well know how to determine such concentrations.

The foaming agent compositions of the present invention can include additives. The additives can be selected from the group consisting of hydrocarbon solvents, antioxidants, hydrocarbon surfactants, a oil soluble corrosion inhibitors, oil soluble paraffin inhibitors, oil soluble asphaltene inhibitors and oil soluble scale inhibitors and mixtures thereof. When a solvent is used, preferably the solvent is one that does not strip off at the formation temperature or well operating temperatures. Failure to use such solvents can, for example, leave a residue on a gas lift system choking the system. In the method of the present invention, the surfactant is preferably formulated using solvents, if any, which will not leave residue on a gas lift system. The wet hydrocarbon foaming agents of the invention can include any one or a combination of any of these additives.

In one embodiment of the invention, the wet hydrocarbon foaming agent is used with a conventional hydrocarbon foaming agent, resulting in a synergistic combination product that works more effectively than either component alone. In an alternative embodiment, a hydrocarbon foaming agent can be used to remove an oil or hydrocarbon phase out of a well first, and then the wet hydrocarbon foaming agent of the invention may be used to remove the remaining water dominate fluid in the wells. In still another alternative embodiment, the wet hydrocarbon foaming agent can be used to remove a wet hydrocarbon out of a well first, and then a conventional hydrocarbon foaming agent can be used to remove the remaining oil dominate fluid.

In one embodiment, the present invention in a method for recovering oil from a gas-lifted oil well penetrating a subterranean oil-bearing formation. The present invention can be used with any gas lift method known to be useful to those of ordinary skill in the art of producing oil. For example the method of the present invention can be used with the gas lift method disclosed in U.S. Pat. No. 5,871,048 to Tokar, et al., which application is fully incorporated herein by reference.

In Tokar, a method for automatically determining an optimum gas injection rate for a gas-lifted oil well is disclosed. The optimum gas-lift slope for the oil well is initially provided and stored in the memory of a programmable logic controller. A lift gas is injected into the well at an initial gas injection rate to displace a liquid at an initial liquid production rate from the well. The initial liquid production rate and initial gas injection rate are stored in the memory. Thereafter, the lift gas is injected into the well at a first incremental gas injection rate differing from the initial gas injection rate by a first incremental value. Additional liquid is displaced from the well at a first incremental liquid production rate and the first incremental liquid production rate and first incremental gas injection rate are stored in the memory. The first incremental slope is determined from the stored data points and compared to the optimum gas-lift slope. The procedure is repeated for a second incremental gas injection rate, wherein the second incremental value is selected as either positive or negative in response to the comparison of the first incremental slope and the optimum gas-lift slope. The second incremental slope is determined from the stored data points and compared to the optimum gas-lift slope. In response to this comparison, the first incremental gas injection rate is determined to be the optimum gas injection rate or the above-recited procedure is repeated for a third incremental gas injection rate and additional incremental gas injection rates, if necessary, until an incremental gas injection rate is determined to be the optimum gas injection rate.

The method of the present invention can also be used with less complex gas lift methods. The present invention can be used with any gas lift method as long as the gas lift method serves the functions of lifting formation fluids to the surface which then results in a lower pressure at the producing strata which in turn results in an increased inflow of formation fluids into the well bore. In all of these methods, the gas injection is done at a depth sufficient to lift formation fluid to the surface and allow for the inflow of additional formation fluid into the well bore. Any combination equipment and methods can be used with the present invention as long as it meets these two basic criteria.

In another embodiment, the present invention is a method for recovering oil from a gas-lifted oil well including the step of injecting a lift gas into the oil well. Any lift gas known to be useful to those of ordinary skill in the art of using gas lift recovery methods can be used with the present invention. One gas commonly used as a lift gas with the present invention is natural gas, preferably that recovered from the same formation as the well subject to the gas lift method. Other gases can also be used including those selected from the group consisting of carbon dioxide, methane, ethane, propane, nitrogen, and mixtures thereof. Any gas that is not detrimental to the formation, such as oxygen, can be used with the present invention.

In yet another embodiment, the present invention is a method for recovering oil from a gas-lifted oil well including the step of injecting a surfactant into the oil well. The surfactants useful with the present invention function to reduce the surface tension between the lift gas and the formation fluid being lifted to the surface and/or create a foam of the lift gas and the formation fluid. This decreased surface tension and or foam formation allows for a decrease in the density of the formation fluid which results in an increase in lift efficiency.

The present invention can reduce the cost of recovery of oil from a gas-lift oil well in at least two ways. A first way that the costs can be reduced in recovering oil from a well wherein the rate of recovery is limited by the amount of gas that can be injected, is by increasing the amount of formation fluids being recovered per unit of gas used. With the method the present invention, oil is recovered more quickly reducing the duration of the maintaining the well with its incumbent costs.

A second way that the present invention can reduce production costs in a well where the rate of recovery in not limited by the amount of gas which can be injected, is by reducing the amount of gas which must be injected. Since the lift gas lifts more efficiently with the method of the present invention, less gas is needed to lift the same amount of formation fluids as compared to a conventional gas lift well operation. Particularly in applications wherein there is not sufficient gas available from the formation being produced and other gasses such as nitrogen or carbon dioxide is being purchased, this can result in a substantial savings as compared to conventional gas lift technology. For purposes of the present application, the term formation fluids means those fluids produced from a oil bearing subterranean formation including but not limited to oil, natural gas, water and the like.

Another embodiment of the present invention is a process for recovering oil from an oil well penetrating a subterranean oil-bearing zone and having at least one additional porous zone between the oil bearing zone and the exit from the oil well, the method comprising using the foaming agent of the present invention to form a foam and forcing the foam into the one additional porous zone. U.S. Pat. No. 4,903,771 to Hanssen, et al. discloses such a method and is included herein by reference. In the practice of this process, the foam formed using the foaming agent of the present invention can be used to block the flow of oil into the additional porous one. In another, but similar embodiment, the foam functions to block the flow of undesirable formation fluids into the wellbore. Preferably, the process of the present invention is employed such that the foam is formed downhole.

In yet another embodiment, the process of the present invention can be practiced in constructions and devices other than oil wells. In this embodiment, the process is employed for removing hydrocarbon fluids from a vessel or pipeline. For the purposes of the invention, the term pipeline means any pipe or other transportation system used to move or store oil and gas in either crude or refined form. For example, the product of the invention can be used with single phase gas pipelines where small amounts of hydrocarbon, formed from condensate, can be undesirable. Desirably, the invention can be used with multiphase pipelines, and especially flow lines from marine wells. Flowlines, the line leading from a marine oil and gas well back to a collection platform, are sometimes subject to the phenomena known as surging where an accumulation of gas in a predominately liquid production stream, often due to the line following the contours of the sea bottom, can cause surging in flowlines where the flowlines become vertical.

The process is practice by contacting the hydrocarbon fluids with a wet hydrocarbon foaming agent of the present invention and then a gas under conditions sufficient to form a foam. Once formed, the foam can be swept from the vessel or pipeline, usually using a flow of gas. The foam, having a much lower density than the fluid from which it is prepared, can be moved more easily than the fluid. Thus, the invention may be used to modify flow regimes and eliminate or at least mitigate slugging.

Although the present invention can be practiced above ground, it has still other uses below ground as well. The process of the present invention can be used with gas producing formations and gas wells. Subterranean formations producing gas, usually natural gas can be partially or even completely blocked by even small amounts of hydrocarbons. This is especially important when the formation has been produced for a while and losses some of the driving energy forcing the gas out of the formation. The foaming agents of the present invention can be used to foam such blocking hydrocarbons, thereby lowering its density and allowing the gas leaving the formation to sweep away the foamed hydrocarbons. The ability of the foaming agents of the present invention to produce foams with higher quality makes it a particularly good agent to use in such applications.

For the purposes of the present invention, the term sweeping has at least two meanings. This term can have its classic dictionary meaning, "to clean or clear, as of dirt, with or as if with a broom or brush" in applications where there is a sufficient flow of gas over the foamed hydrocarbons that the actual foam is pushed or otherwise carried away in sections of visible foam. The term sweeping also includes the applications where the foaming agent increases the tendency of the hydrocarbon to become entrained and be carried away on a droplet basis. The term sweeping also includes any application intermediate to these as well.

The wet hydrocarbon foaming agent compositions of the present invention, as well as being a marketable product in its own right, can also be used as an additive in other oil and gas production products. Such additives are well known in the art of producing oil and gas. The foaming agents of the present invention can be included in almost any oil and gas production treating fluid except for defoamers. For example, the foaming agents of the present invention can be included with a material selected from the group consisting of corrosion inhibitors, hydrate inhibitors, bactericides, wax inhibitors, scale inhibitors, asphaltene inhibitors, microbiocides, and mixtures thereof. Corrosion inhibitors are well known and disclosed in, for example, U.S. Pat. No. 5,753,596 to Martin, et al. Hydrate inhibitors are disclosed in, for example, U.S. Pat. No. 6,165,945 to Halliday, et al. Bactericides and microbiocides are disclosed in U.S. Pat. No. 4,164,574 to Quinlan. Asphaltene inhibitors are disclosed in U.S. Pat. No. 6,270,653 to Gochin. Scale inhibitors are disclosed in U.S. Pat. No. 5,089,619 to Thompson, et al. Wax or paraffin inhibitors are disclosed in U.S. Pat. No. 3,669,189 to Fischer.

Where, in the practice of the method of the present invention, surfactants function to create a foam, it is sometimes desirable to break the foam after it is recovered from the well. The term "breaking a foam", for the purposes of the present invention, means to separate the gaseous component of the foam from the liquid component. Any method known to be useful to those of ordinary skill in the art of breaking foams such as those sometimes formed in the practice present invention can be used with the present invention, including both chemical and mechanical methods.

EXAMPLES

The following examples are provided to illustrate the present invention. The examples are not intended to limit the scope of the present invention and they should not be so interpreted. Amounts are in weight parts or weight percentages unless otherwise indicated.

Example 1

A hydrocarbon foam is prepared by admixing gas condensate with an oil field brine in the ratios shown below in Table 1. The treatment agent, Agent A, is a polysiloxane having a molecular weight of about 26,000. The liquid removal amount is measured from 100 ml fluid in a 1000 ml column with $N_2$ gas (15 SCH) blow through a fret glass in the bottom. The test temperature is 70° C. and liquid removal amount is measured after 5 minutes. The concentration of the foaming agents is 1 percent. A conventional hydrocarbon foaming agent, an alky-ether sulfate, is also tested as a control.

TABLE 1

Liquid Removal By Foam Generation

| | Total Volume Liquid Removed (ml) | |
|---|---|---|
| Condensate/Brine (v/v) | Wet Hydrocarbon Foaming Agent A (20% active) | Alkyl ether sulfate** (60% active) |
| 100/0 | 59 | 4* |
| 90/10 | 54 | 4* |
| 50/50 | 40 | 4* |
| 30/70 | 29 | 61 |

*Due to evaporation at high temperature.
**A control and NOT an example of the invention.

It can be seen from Example 1 that the wet hydrocarbon foaming agent is effectives in the presence of brine even though the removal amount is decreased in presence of brine. In contrast, the brine soluble foaming agent control is only effective after the brine concentration is over 70% in condensate/brine mixture.

Example 2

A hydrocarbon foam is generated substantially identically to Example 1. The liquid removal is measured from 100 ml fluid in a shorter column (250 ml) with $N_2$ gas (15 SCH) blow through a fret glass in the bottom. The test temperature is 25° C. and liquid removal amount is measured after 5 minutes. A conventional hydrocarbon foaming agent, a dicocoalkyl ammonium chloride, is also tested as a control. The concentration of foaming agent is 1%. The hydrocarbon is kerosene, the brine is standard NACE brine (4.07 g/l $CaCl_2.2H_2O$, 1.86 g/l $MgCl_2.6H_2O$, 94.1 g/l NaCl). The results are displayed below in Table 2.

TABLE 2

Liquid Removal By Foam Generation

| | Total Volume Removed (ml) | |
|---|---|---|
| Condensate/Brine (v/v) | Foaming Agent A (20% Active) | Dicocoalkyl ammonium chloride (75% active) |
| 100/0 | 70 | 50 |
| 75/25 | 51 | 0 |

It can be seen that the wet hydrocarbon foaming agent is effective with 25% brine while the conventional foaming agent, dicocoalkyl ammonium chloride, became ineffective in the presence of 25% brine.

Example 3

A hydrocarbon foam is generated using a series of polysiloxanes otherwise similar, but having the molecular weights as shown in Table 3 below. The liquid removal amount is measured from 100 ml fluid in 1000 ml column with $N_2$ gas (15 SCH) blow through a fret glass in the bottom. The test temperature is 25° C. and liquid removal amount is measured after 5 minutes. The hydrocarbon is Isopar M (from Exxon chemicals), and the brine is standard NACE brine (4.07 g/l $CaCl_2.2H_2O$, 1.86 g/l $MgCl_2.6H_2O$, 94.1 g/l NaCl). The ratio of hydrocarbon to brine is 90/10. The foaming agent concentration is 250 ppm.

TABLE 3

Liquid Removal By Foam Generation

| Molecular weight of polysiloxane | Liquid removal amount (ml) |
|---|---|
| 600 | 0 |
| 6600 | 29 |
| 16000 | 50 |
| 26000 | 29 |
| 64000 | 0 |
| 94000 | 0 |

It can be seen that optimum molecular weight of the polysiloxane under these condition is from about 6,000 to about 60,000 for this hydrocarbon/brine mixture. It would be expected that the actual optimum molecular weight of a wet hydrocarbon foaming agent for any application may vary depending upon the conditions under which it will be used including but not limited to the composition of the wet hydrocarbon, the lift gas to be used, the physical conditions of the location of use, and the rate at which foam is be produced.

Example 4

A wet hydrocarbon foaming agent is used with a conventional hydrocarbon foaming agent to show a synergistic effect. In this experiment a foaming agent, or combination of foaming agents as set forth in Table 4 is admixed with a wet hydrocarbon having 10 percent brine in field condensate and 100 ml are placed into a 1 liter cylinder having fret glass in the bottom of the cylinder. The concentration of the foaming agents is also disclosed in Table 4. Nitrogen is fed into the cylinder at a rate of (15 SCH) and foam amount and foam production rates are measured. The results are disclosed below in Table 4.

TABLE 4

FOAM HEIGHT AND PRODUCTION RATE

| Foaming agent | Concentration | Time of foam reach to 1000 ml or maximum volume |
|---|---|---|
| Polysiloxane (20% active) (Wet Hydrocarbon Foaming Agent) | 2.0% | 2 minute to maximum 450 ml |
| Alkyl ether sulfate (60% active) (Conventional Hydrocarbon Foaming Agent) | 1.0% | 2 minute to maximum 200 ml |
| Polysiloxane (20% active)/ Alkyl ether sulfate (60% active) 2/1 ratio | 3.0% | 24 second reach to 1000 ml |

It can be seen that mixture of these two foaming agent can produce higher foam which either one alone can not attain.

What is claimed is:

1. A process for recovering oil from a gas-lifted oil well penetrating a subterranean oil-bearing formation, the process comprising:
   A) providing a lift gas and a wet hydrocarbon foaming agent at an oil well wherein the oil well penetrates a subterranean oil-bearing formation and has formation fluids in the well bore;
   B) introducing a lift gas into the oil well; and
   C) introducing a wet hydrocarbon foaming agent into the oil well, wherein:
     i) the wet hydrocarbon foaming agent functions to:
       (a) reduce the surface tension between the formation fluids and the lift gas;
       (b) create a lift gas-formation fluid foam; or
       (c) both (a) and (b);
     ii) the wet hydrocarbon foaming agent and lift gas are injected into the oil well at a depth sufficiently deep to lift formation fluids to the surface; and
     iii) the wet hydrocarbon foaming agent is selected from the group consisting of a polysiloxane, an ethoxylated siloxane, a propoxylated siloxane, an ethoxylated and propoxylated siloxane and combinations thereof.

2. The process of claim 1 additionally comprising using a hydrocarbon soluble foaming agent.

3. The process of claim 2 wherein the wet hydrocarbon foaming agent and the hydrocarbon soluble foaming agent are introduced into the well together.

4. The process of claim 2 wherein the wet hydrocarbon foaming agent is introduced into the oil well first.

5. The process of claim 2 wherein the hydrocarbon soluble foaming agent is introduced into the well first.

* * * * *